Jan. 7, 1958 W. H. HENDERSON 2,818,653
COMBINED GRADE SET AND LEVEL ROD
Filed May 21, 1953 2 Sheets-Sheet 1
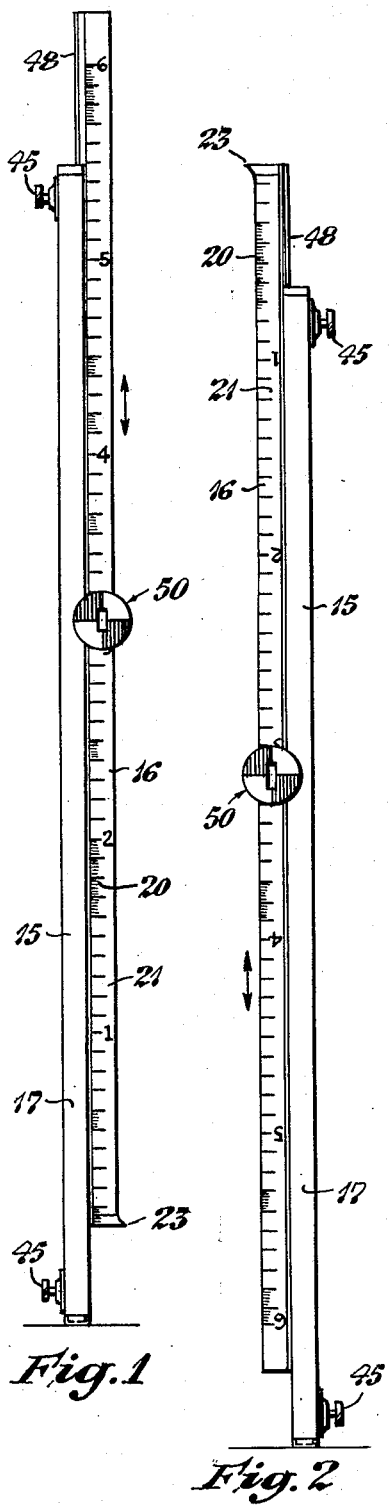
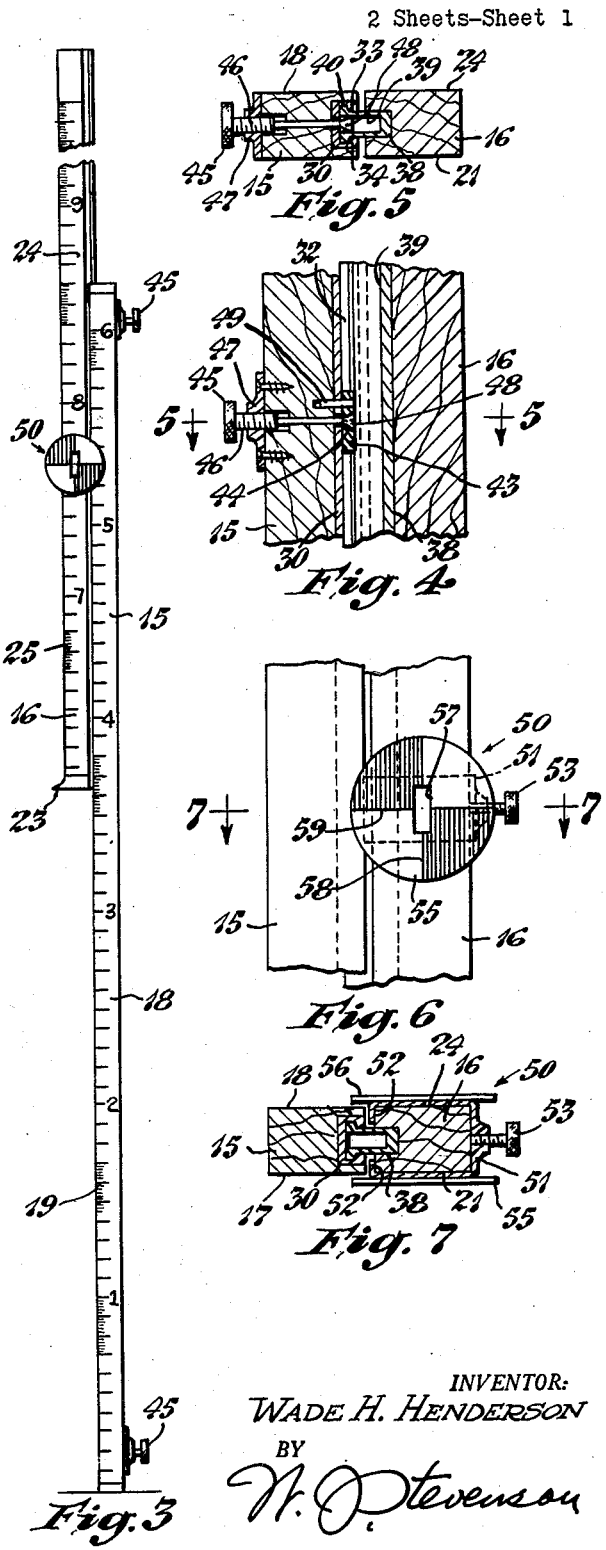
INVENTOR:
WADE H. HENDERSON
BY
N. Stevenson Jan. 7, 1958 W. H. HENDERSON 2,818,653
COMBINED GRADE SET AND LEVEL ROD
Filed May 21, 1953 2 Sheets-Sheet 2

INVENTOR:
WADE H. HENDERSON
BY
M. Stevenson

United States Patent Office 2,818,653
Patented Jan. 7, 1958

2,818,653

COMBINED GRADE SET AND LEVEL ROD

Wade H. Henderson, Compton, Calif.

Application May 21, 1953, Serial No. 356,576

7 Claims. (Cl. 33—74)

This invention relates to the surveying art and more particularly to equipment used in leveling and setting grades. Specifically, the invention pertains to a combination level and grade-set rod employed in connection with an engineer's level instrument for setting grades or elevations on vertical surfaces and on fill sections for earthwork.

It is the usual practice when setting grades on vertical surfaces to employ what is termed a level rod which is a simple vertical rod having graduations in increments of feet, tenths and hundredths of feet, with the zero mark at the lower end. A conventional target, having a horizontal center line or indicator, is slidably mounted for vertical movement on the rod with the center line registering with the graduations. The level instrument is set up in position at a selected place and the level rod is placed upon a predetermined point, which is a previously set "bench mark" (B. M.), and the reading on the rod is next recorded. The bench mark elevation plus the rod reading equals the H. I. (height of instrument sight). The elevation or grade to be set is then subtracted from the H. I. to obtain the grade rod setting, and the target is then set at that reading. The rod is then placed adjacent a point on the vertical surface where the grade is to be set and the rod man moves the rod upwardly or downwardly as directed by the instrument man until the target is set in exact alignment with the instrument sight. The rod man then marks the zero or bottom of the rod on the vertical surface to set the elevation or grade. Since the rod must be held stationary during this operation, it is customary to employ two men at the rod, one to support the rod and the other to record the indicated figures, perform the necessary calculating and mark the vertical surface to set the grade. In addition to the disadvantage of requiring the services of two men at the rod, the conventional method referred to above may result in inaccuracies due to errors which may occur when moving the rod upwardly or downwardly while at the same time maintaining the rod vertical at all times, the rod being supported solely by the rod man.

The conventional rod mentioned above is also employed when setting the grade on a fill section for earth work. In this case, the rod is set up on the established bench mark and a reading is taken. The B. M. elevation plus the rod reading equals the H. I. The rod is then set up at a location on the ground where the grade is to be established. The difference between the grade rod reading and the new reading on the rod indicates the amount which the earth must be excavated or filled in to bring it to the desired grade level, this amount being recorded and marked on a stake driven into the ground at the point under consideration. The instrument man must signal the rod man as to the amount to be marked as cut or fill at that point.

It is an object of my invention to simplify the setting of grades on vertical surfaces and the marking of "fill" sections at spaced points by providing means whereby it is possible for a single rod man to perform all the duties required at the rod. This object is achieved by providing a new and improved rod by which grade setting may be effected with a minimum of calculating, the setting of grades on vertical surfaces requiring no computation.

Another object of the invention is to provide a rod which may be used for setting grades, as regards both vertical and horizontal surfaces. This object is attained by providing a two-sectional rod, one of the sections of the rod being slidable vertically relative to the other rod, said sections having linear graduations on their front and back sides and the slidable section having an indicator at its lower end registerable with the graduations of the other rod section. In accordance with another feature and object of the invention, a target is adjustably carried by the slidable rod section and has two faces, each observable at a side of the rod, the invention providing a novel clamping means by which the target can be retained in adjusted positions on the movable rod section.

Another object of the invention is to provide a rod, of the character referred to, in which the linear graduations are so arranged that the front side of the rod and its target face are employed for establishing both plus and minus grades on vertical surfaces, and the reverse side of the rod is used in conjunction with the front side in establishing grades along the ground or other horizontal surfaces, the rod being used in inverted position when establishing plus grades.

Another object of the invention is to provide a two-sectional rod of the type indicated having interengaging tongue-and-groove portions at their adjoining vertical edges insuring parallelism between the sections and allowing free sliding movement of the adjustable section. A related object is to provide in a sectional rod, of the class referred to, quick acting clamp means by which the slidable section can be locked in its selected positions of vertical adjustment.

A further object is to provide a rod of the type specified which is simple in construction and durable in use, one which is highly practical and accurate in use, and one which greatly expedites the leveling and grade setting procedures with a minimum of effort and personnel.

Further objects will appear from the folowing description and from the drawing, which is intended for the purpose of illustration only, and in which:

Fig. 1 is an elevational view of the front or "grade-set" side of my combined grade-set and level rod;

Fig. 2 is a similar view, showing the sectional rod in inverted position;

Fig. 3 is an elevational view of the rear or "level-rod" side of the rod;

Fig. 4 is an enlarged vertical sectional view through the rod sections at the clamping means;

Fig. 5 is a cross-sectional view, taken on line 5—5 of Fig. 4;

Fig. 6 is an enlarged, fragmentary front view of the rod sections, showing the target mounted thereon;

Fig. 7 is a cross-sectional view taken on line 7—7 of Fig. 6;

Figure 8:
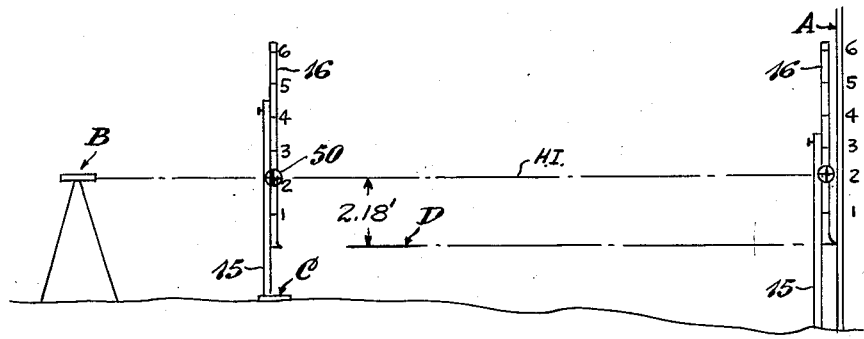
Fig. 8 is a diagrammatic view, illustrating the method of applying the grade-set side of the rod to use in setting a minus grade on a vertical surface.
Figure 9:
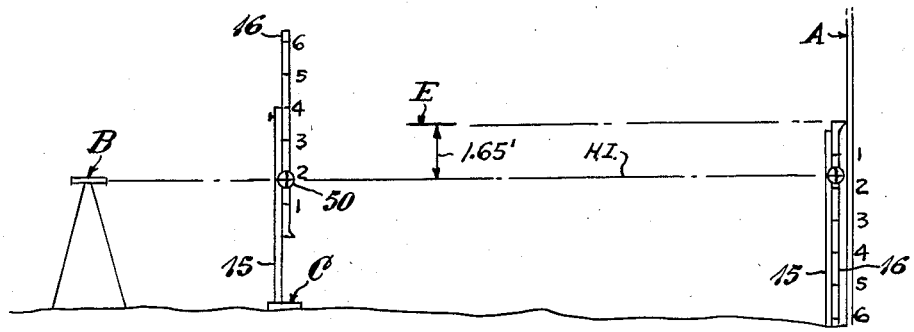
Fig. 9 is a similar view, with the rod used in setting a plus grade on a vertical surface.

Referring first to Figs. 1 through 7, my combined grade-set and level rod comprises a pair of rod sections 15 and 16 which are arranged in side-by-side relation as shown. The rod section 15 has a plain front or grade-set face 17, that is, without graduations or scale markings. Its opposite or level rod face 18, however, is provided with a linear scale 19, the graduations 1, 2, 3, etc., representing linear feet and the subdivisions between these numerals designating hundredths of feet, the zero marking being at the lower end of the rod section. The section 15 may be made of any desired and practical length, for example of such length that its graduation adjacent the upper end of the section represents the six-foot marking of the scale.

The other rod section 16 has a scale 20 on its front or grade-set face 21, the graduations thereof being in foot increments and hundredths thereof, from zero at the lower end of the section to, say, six feet adjacent the upper end of the section. At its lower zero end, the rod section 16 has a point or indicator 23. The rear or level rod face 24 of the rod section 16 has a linear scale 25 having graduations starting with a seven-foot mark at a point one-foot above the lower indicator end 23 and ending with the reading twelve-feet adjacent its upper end.

As shown, the rod sections 15 and 16 are arranged for relative vertical sliding movement by reason of a tongue-and-groove connection shown in Figs. 4 and 5. The connection means includes a first female slide element 30 of substantially rectangular cross section permanently secured within a groove formed in the longitudinal edge of the rod section 15 which is adjacent the other section 16. The slide element 30 has a guideway 32 which extends throughout the length of the element, the guideway having a narrow portion or open slot 33 and tapered surfaces or seats 34.

The other rod section 16 has a groove in its longitudinal edge adjacent the section 15 and permanently secured in this groove is a male slide element 38 of substantially U-shaped cross section providing a longitudinal channel 39. The sides of the slide element 38 are provided with outwardly directed, longitudinal flanges or tongues 40 which, as shown, fit within the tapered sides of the groove 31 of the slide element 30, the tongues 40 having tapered surfaces engaging against the correspondingly tapered seats 34.

The tongues 40 have a close, but sliding fit in the grooves at the ends of the guideway 32. By this provision, the rod sections 15 and 16 are retained in side-by-side relation but are adapted for longitudinal sliding movement relative to each other, for the purposes to be later explained.

The invention provides means for clamping the rod sections in different positions of longitudinal adjustment. This means includes a split, radially expansible clamping plate 43 which is disposed within the channel 39 of the slide element 38, the plate having a tapered hole 44. The clamping means also includes a thumb screw 45 having a threaded portion 46 which is screwed through a threaded hole in a plate 47 secured to the outer side edge of the rod section 15. The inner reduced end of the clamping screw 45 has a conical head 48 which fits within the tapered hole 44 of the plate 43.

After the rod sections 15 and 16 have been adjusted longitudinally, the thumb screw 45 is rotated in a direction to cause its conical head 48 to wedge in the tapered hole 44 of the plate 43 so as to expand the plate into firm engagement with the sides of the slide element 38 and to spread these sides to cause the tongues 40 to engage firmly with the seats 34. Thus, the rod sections are positively retained in selected adjusted positions and when it is desired to change the relative setting of the sections, it is only necessary to loosen the clamping screw 45 to free the sections for relative sliding movement. In practice, two such clamping means are employed as shown. A dowel 49 on the plate 43 is slidable in a hole in the slide element 30 and thus serves to prevent rotation of the plate when the latter is located outwardly beyond the end of the rod section 16.

Referring now particularly to Figs. 6 and 7, the present rod has a target device 50 which includes a channel-shaped slide member or holder 51. The member 51 embraces the rod section 16 and the ends of its vertical sides are bent inwardly to provide runners 52 which engage the inner vertical edge of the movable rod section 16, within the clearance space existing between the rod sections 15 and 16. A set screw 53 is threaded through the holder 51 into engagement with the outer vertical edge of the rod section 16 and by tightening this screw the holder is retained in any position of vertical adjustment.

Secured to the sides of the holder 51 are front and rear targets 55 and 56 in the form of relatively large discs, each having a central rectangular hole 57 and crossing vertical and horizontal lines 58, 59 defining quarter circles which are appropriately colored in accordance with the usual practice in conventional targets of this nature. The combination grade-set and level rod having been described in detail, the manner of applying it to use is explained as follows:

Assuming that it is required to set a minus grade on a vertical surface A, the engineer's level instrument B is set up at a selected position and level in the usual manner. The present rod is then placed in upright position upon a point or bench mark C, the elevation of which has previously been established, the lower end of the rod section 15 resting upon the point C, as shown in Fig. 8. Assuming that the new grade to be established on the vertical surface is to be at the level indicated by the reference letter D, and that this new grade is, for example, 2.18' below the H. I., then the H. I. minus 2.18' equals the grade to be set. The target is then set on the scale mark 2.18' on the movable rod section 16 and clamped thereto. The instrument man sights the rod and signals to raise or lower the rod section 16 until the center line of the target coincides with the line of sight. The thumb screw 45 is then tightened to clamp the section 16, and its target 50, in the adjusted position, the sections 15 and 16 then becoming a rigid unit.

The rod is then set up with the lower end of the section 15 resting upon the ground or floor adjacent the vertical surface A by the rod man. The instrument man then sights the rod and signals the rod man to raise or lower the rod section 16 relative to the section 15 until the center line of the target 50 coincides with the line of sight. In order to effect such vertical movement of the rod section 16, the clamping screw 45 is first loosened and after the target has been properly positioned, the screw is tightened. Since the target remains fixed on the scale at the 2.18' mark above the lower zero end of the section, the indicator 23 designates the newly established grade on the surface A and this new grade is suitably marked on the surface. It is to be noted that the rod 15, 16 is shown as turned ninety degrees from the position assumed during the setting of the grade, in order to simplify the illustration.

When it is required to establish a plus grade setting E upon the vertical surface A and this new grade is calculated to be, for example, 1.65' above the horizontal line of sight of the instrument B (H. I.), the target 50 is adjusted along the rod section 16 to register its center line with the 1.65' marking on the section 16.

The rod 15, 16 then is inverted and placed upon the ground or floor adjacent the vertical surface A. The rod man then raises or lowers the rod section 16, as directed by the instrument man to align the target line with the line of sight. Consequently, the indicator 23 is located at a level 1.65' above the line of sight, which is the required new grade. A mark is then placed on the vertical surface A at the indicator.

It is to be noted from the foregoing that following the initial setting of the target at the appropriate mark on the scale 20 of the rod section 16, when the rod is in place upon the elevation point C, no further computation is necessary, the target remaining fixed to the section 16 and the latter being adjustable vertically of the section 15 to set the grade at any number of selected points on the vertical surface. The present sectional rod thus makes it possible for a single rod man to manipulate the rod, that is, hold the rod in erect position, to move the target into registry with the sight line, and to set the grade on the vertical surface. The simplified procedure made possible through the use of my two-part rod thus results in greatly expediting the grade setting with a minimum of personnel and eliminates the possibility of error which frequently occurs when the rod man is required to compute the elevation of the grade at the rod, find the corresponding elevation graduation on the rod scale and mark the vertical surface opposite this established graduation. It is to be noted that when using the grade-set side of the sectional rod, the section 15 serves solely as a post-like support for the other section 16.

Figure 10:
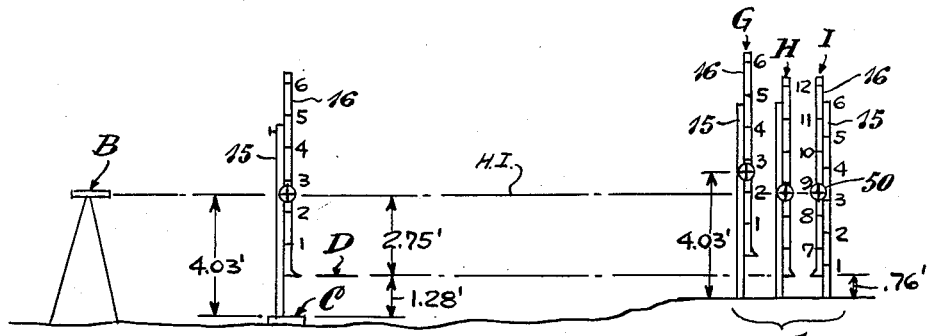
Fig. 10 is also a similar view, showing the rod applied to use in establishing a grade at a selected point on a horizontal surface.
Figure 11:
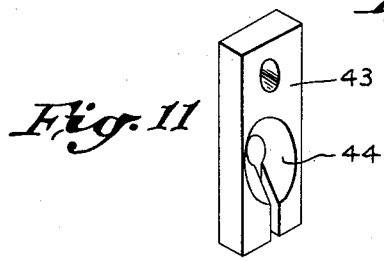
Fig. 11 is a perspective view of the lock plate involved in my construction.

Assuming now that it is required to set a grade on a fill section for earthwork, the procedure followed is as illustrated in Fig. 10. As the first step, the rod is placed upon the bench mark or point C with the lower end of the section 15 resting upon this point. By sighting through the instrument B, the elevation of the sight above the point C is found, and let us assume that this vertical distance is 4.03', which is the H. I.

When the elevation of the grade to be set at point F is 2.75' below the H. I. and the target is set at 2.75' on the front grade set face of the rod, the rod section 16 is lowered to align its target with the sight line. The rod sections are then clamped together. The lower indicator end 23 of the rod section is then accurately located at the required new grade or elevation.

As indicated at I, the rod man then observes the rear or level rod face 25 (shown in Fig. 3) and notes, let us say, that the indicator 23 of the section 16 coincides with graduation mark .76' of the scale 19. This means that the ground must be built up .76' at the station F to bring it to the required new grade or elevation which, as explained, is 2.75' below the H. I. The rod man notes this reading and marks the fill on the stake at that point, entering the data in his book.

It is thus seen that by manipulating the rod section 16 and its target 50 as explained above the computing is accomplished automatically and accurately without mental calculations so that the chances of mental error are eliminated. Moreover, the single rod man performs the several operations in a systematic series of steps and the necessity for recording figures during the procedure is avoided, only the final reading, for example the resultant .76' figure mentioned above, being recorded by the rod man for reference.

When the rod is adjusted to a fully extended condition, the zero end of the scale 25 of the rod section 16 registers with the mark of highest value, for example 6', on the scale 19 of the other rod section 15. With the sections clamped together in this relation, the rear side of the rod provides a level rod which may be employed for setting grades or elevations on horizontal surfaces, for cross-sectioning, differential leveling and in connection with various other procedures where the conventional level rod is ordinarily used.

In accordance with the provisions of the patent statutes, I have herein described the principle of operation of my invention, together with the combination grade set and level rod which I now consider to represent the best embodiment thereof, but I desire to have it understood that the rod structure shown is only illustrative and that the invention may be carried out by modified means.

I claim as my invention:

1. A grade set rod, comprising: a first vertical rod section having a lower end for placement upon the ground or other substantially horizontal surface; a second vertical rod section disposed alongside said first section and slidably adjustable lengthwise thereof, said rod sections being arranged in a common plane and having coplanar first faces extending parallel to said common plane, said second section having a linear scale on its said first face; clamping means operative to retain said second section in selected positions of vertical adjustment relative to said first rod section; and a target slidably adjustable on said second section along said first faces and registerable with the graduations of said linear scale.

2. A grade set rod, comprising: a first vertical rod section having a lower end for placement upon the ground or other substantially horizontal surface; a second vertical rod section disposed alongside said first section and slidably adjustable lengthwise thereof, said rod sections being arranged in a common plane and having coplanar first faces extending parallel to said common plane, said second section having a linear scale on its said first face with the zero graduation of the scale located at the lower end of the section; clamping means operative to retain said second section in selected positions of vertical adjustment relative to said first rod section; and a target slidably adjustable on said second section along said first faces and registerable with the graduations of said linear scale, said second rod section being projectible selectively beyond the upper and lower ends of said first rod section.

3. A grade set rod, comprising: a first vertical rod section having a lower end for placement upon the ground or other substantially horizontal surface; a second vertical rod section disposed alongside said first section and slidably adjustable lengthwise thereof, said rod sections being arranged in a common plane and having coplanar first faces extending parallel to said common plane, said second section having a linear scale on its said first face; clamping means operative to retain said second section in selected positions of vertical adjustment relative to said first rod section; and a target slidably adjustable on said second section along said first faces and registerable with the graduations of said linear scale, a longitudinal tongue on one of said sections and a longitudinal groove in the other section receiving said tongue, said tongue and groove permitting relative longitudinal adjustment between the rod sections, said tongue and groove being in said common plane.

4. A grade set rod as defined in claim 3 in which said tongue-and-groove means includes a first, female, slide element carried by and extending longitudinally of said first section and providing a guideway having a reduced portion and tapered seats at the sides thereof, a second, male, slide element carried by and extending longitudinally of said second section, said second element being of channel-shaped cross section and providing sides having longitudinal tapered tongues engageable with said seats, a split, expansible clamping plate disposed within said second slide element and having a conical hole, and a clamping screw threaded through a plate carried by said first rod section and extending through a hole in said first section, said screw having a conical head engaging in said clamping plate, dowel means engaging between said clamping plate and said first slide element for preventing relative rotation therebetween, rotation of said screw causing said head to wedge in said hole of said clamping plate so as to expand the latter to cause spreading of the tongues of said second slide element into firm engagement with said seats and thereby lock said second rod section in adjusted position relative to said first rod section.

5. A combination grade set and level rod, comprising: a first vertical rod section having a lower end for placement upon a substantially horizontal surface; a second vertical rod section disposed alongside said first section and slidably adjustable lengthwise thereof, said rod sections being arranged in a common plane and having first coplanar faces extending parallel to said common plane and together constituting a grade set rod, said sections also having second coplanar faces parallel to said common plane, said second faces together constituting a level rod, the first face of said second rod section having thereon a first linear scale, the zero graduation of which is at the lower end of said second section, the second face of said first section having thereon a second linear scale, the zero graduation of which is at the lower end of said first section, and the second face of said second section having thereon a third linear scale, the lower graduation of which is at the lower end of said second section, said third scale providing a continuation of said second scale when its said lower graduation is in register with the highest graduation of said second scale; and a target slidably adjustable on said second rod section and registerable with the graduations of said first scale.

6. A combination grade set and level rod as defined in claim 5, in which said target includes a holder movable along said second section and having parallel side portions disposed against the first and second faces of said second rod section, and a pair of target discs, each mounted on a said side portion and having a cross-line, movement of said holder along said second section effecting adjustment of the cross-lines of said discs along said first and third scales.

7. An engineering rod, comprising: a first vertical rod section of substantially rectangular cross section; a second vertical rod section of substantially rectangular cross section, said sections being disposed in side-by-side relation and having adjoining edges in close association, one of said sections having a longitudinal tongue projecting from its said edge and disposed in a longitudinal groove in the corresponding edge of the other section and permitting relative vertical sliding movement between said sections, said tongue and groove being located on a common medial vertical plane passing through said sections, said rod sections having first, coplanar vertical faces at one side of the rod extending parallel to said medial plane and second, coplanar vertical faces at the opposite side of the rod extending parallel to said medial plane, the first face of said second rod section having a first linear scale thereon, the second face of said first rod section having a second linear scale thereon, and the second face of said first rod section having a third linear scale thereon; and a target element slidably mounted on said second rod section and carrying a first target disc disposed at said first face and registerable with said first scale and a second target disc disposed at said second face and registerable with said second scale, the lower end of said second section providing a pointer registerable with the graduations of said third scale when the rod is employed for determining the amount of fill necessary to establish a predetermined grade.

References Cited in the file of this patent
UNITED STATES PATENTS

| | | |
|---|---|---|
| 599,242 | Klein | Feb. 15, 1898 |
| 833,880 | Keuffel | Oct. 23, 1906 |
| 1,165,820 | Watson | Dec. 28, 1915 |